United States Patent
Schmidt

(10) Patent No.: US 12,432,064 B1
(45) Date of Patent: Sep. 30, 2025

(54) MAINTAINING CRYPTOGRAPHICALLY VERIFIABLE DATA SHARE TRACES FOR SERVICES OF A PROVIDER NETWORK

(71) Applicant: Amazon Technologies, Inc., Seattle, WA (US)

(72) Inventor: Stephen E Schmidt, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 18/194,584

(22) Filed: Mar. 31, 2023

(51) Int. Cl.
| | |
|---|---|
| *H04L 29/06* | (2006.01) |
| *H04L 9/08* | (2006.01) |
| *H04L 9/32* | (2006.01) |
| *H04L 9/40* | (2022.01) |

(52) U.S. Cl.
CPC ............ *H04L 9/3213* (2013.01); *H04L 9/085* (2013.01); *H04L 63/107* (2013.01)

(58) Field of Classification Search
None
See application file for complete search history.

(56) References Cited

U.S. PATENT DOCUMENTS

| | | |
|---|---|---|
| 9,529,658 B2 | 12/2016 | Jan |
| 9,916,232 B2 | 3/2018 | Voccio |
| 10,284,660 B1 | 5/2019 | Nene |
| 10,481,963 B1 | 11/2019 | Walker |
| 10,484,429 B1 * | 11/2019 | Fawcett ................. H04L 63/20 |
| 11,209,961 B2 | 12/2021 | Pope |
| 11,790,107 B1 | 10/2023 | Jain |
| 11,899,760 B2 * | 2/2024 | Groth .................... G06F 21/577 |
| 2006/0142005 A1 | 6/2006 | Takaluoma |
| 2017/0302655 A1 | 10/2017 | Sondhi |
| 2018/0062942 A1 | 3/2018 | Walsh |
| 2022/0107744 A1 * | 4/2022 | Capelo .................. G06N 20/00 |
| 2022/0131851 A1 | 4/2022 | Singh |
| 2023/0297716 A1 * | 9/2023 | Bella ..................... H04W 12/10 726/1 |
| 2024/0184916 A1 * | 6/2024 | Bella ..................... H04L 63/105 |

FOREIGN PATENT DOCUMENTS

| | | |
|---|---|---|
| CN | 104247371 A | 12/2014 |
| CN | 112329383 A | 2/2021 |
| JP | 2002527966 A | 8/2002 |
| JP | 3538525 B2 | 4/2005 |
| JP | 7160972 B2 | 10/2022 |

OTHER PUBLICATIONS

"Amazon Macie, User Guide", Amazon Web Services, Jan. 2022, p. 1-294. (Year: 2022).*
U.S. Appl. No. 18/194,581, filed Mar. 31, 2023, Stephen E. Schmidt.

* cited by examiner

*Primary Examiner* — Jeffery L Williams
(74) *Attorney, Agent, or Firm* — S. Scott Foster; Kowert, Hood, Munyon, Rankin & Goetzel, P.C.

(57) ABSTRACT

Cryptographically verifiable data share traces are maintained for services of a provider network. Different data share traces for parameters submitted in requests via different interfaces of different services are obtained and stored as part of a cryptographically verifiable data structure. Requests to obtain the data share traces may be received and returned with the requested data share traces in a cryptographically verifiable form.

20 Claims, 12 Drawing Sheets

MAINTAINING CRYPTOGRAPHICALLY VERIFIABLE DATA SHARE TRACES FOR SERVICES OF A PROVIDER NETWORK

BACKGROUND

Cloud-based infrastructure offers many advantages for companies, developers, or other entities. Many different services in a cloud, both external facing and internal facing, may support the performance of various tasks, operations, or capabilities offered by the services. As more services or features of services are added to the cloud, the relationships between these services may expand. For example, to add a new feature, one service may rely upon the capabilities of another service in order to support tasks or operations of the new feature. Moreover, with expanded relationships between services comes sharing of data across services.

Figure 1:
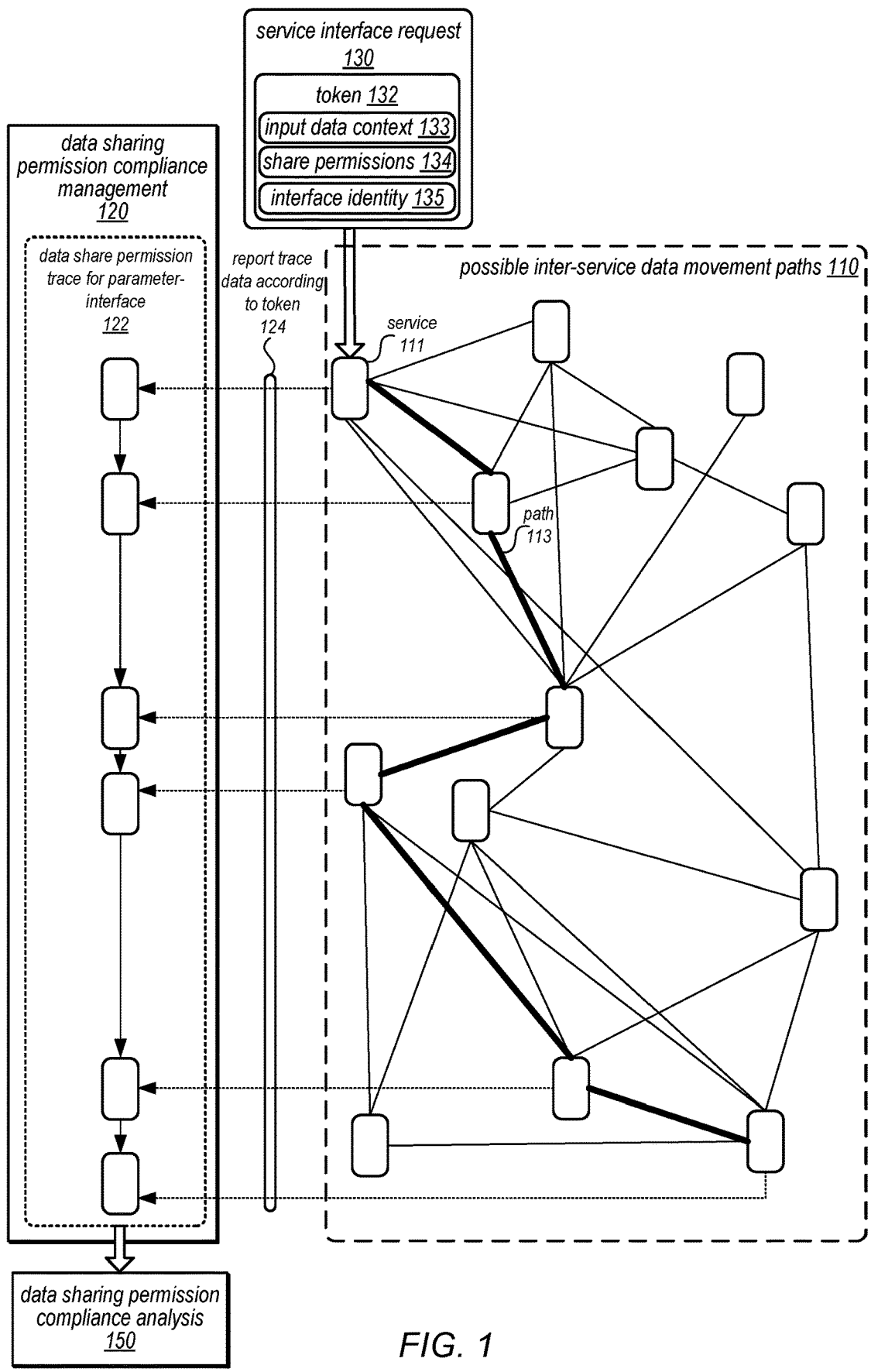
FIG. 1 is a logical block diagram illustrating tracing data share permission enforcement of parameters through service interfaces, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques of maintaining cryptographically verifiable data share traces for services of a provider network are described herein. Cloud providers, also referred to as provider networks, offer many different services so that client systems, applications, or devices can invoke features of the different services to perform various operations through interfaces of the services. As part of invoking service interfaces, data may be included as parameters of the different service interfaces. For example, selections of items, features, or the performance of various transactions may include data that is used to perform an operation (e.g., to purchase, consume, or display a video, obtain an image, or request details on an item) may be included as parameters.

This data may or may not be shared with other services according to data sharing permissions that may be specified as part of the interface request (or in conjunction with the interface request). For example, usernames, selected, items, or requests to perform various operations, such as operations that invoke a hosted computing resource on behalf of a client application (e.g., to generate an inference using a machine learning model) may be data that is included in a parameter. Data sharing permissions may determine whether this data in the parameter is permitted to be used (or not) at other services, which may receive the data as part of various communications with other services or have access to the data.

Because cloud providers offer a large number of different services (e.g., hundreds or thousands) which may include various groups or collections of systems, sub-systems, or micro-services that may be managed independently from one another (e.g., developed, updated, patched, or otherwise modified independent from different series) and each of which may also interact with multiple other services as part of performing one request through one interface, the possible number of movement paths over which data received as a parameter in one interface may become very large. Unlike network tracing techniques which can determine the number of possible routes a network communication may take according to a known network topology (e.g., the existence and number of network hops between different devices connected to a network), the movement of data across services may have significantly more possible paths, as it is operations performed by the various services which may determine when, where, and if the data moves to another service, and not simply the existence of the capability of the data to be moved over a network connection between services.

Moreover, these complexities are compounded when multiple interfaces are implemented, in some embodiments, at each service. Therefore, techniques which can discover the movement of data input through a parameter of an interface request may be highly desirable as determining whether the data should be shared or is shared may be important for ensuring that data security and compliance schemes for sharing data (e.g., industry regulations, national or multinational regulations, best practices, privacy protections, or various other requirements to be enforced with respect to how data is shared) are correctly applied. As the development of services and interfaces may proceed independently, a centralized view of the movement data subject to these data security and compliance schemes may allow for analysis as to the effectiveness of enforcement components for data sharing permissions across the different services without interfering with the independent development of services. Services may include various forms of system, collection of one or more micro-services, or grouFor example, external audits (or internal audits) of compliance with data sharing regulations can be performed using complete and accurate understandings of data movement for both shared and not shared data across the many services of a cloud provider.

FIG. 1 is a logical block diagram illustrating tracing data share permission enforcement of parameters through service interfaces, according to some embodiments. As indicated at 110 many possible inter-service and intra-service data movement paths may exist. A service, such as service 111, may interact with many other services (also represented by similar shapes in FIG. 1) directly or indirectly. Although FIG. 1 depicts 13 services and possible movement paths, it should be understood that FIG. 1 is merely an illustrative example and the number of movement paths between could be significantly more than what is depicted.

Service 111 may implement one or multiple interfaces (e.g., programmatic, such as Application Programming Interface (API), graphical (e.g., a web-based user interface console), or command line, one of which may receive service interface request 130. Service interface request 130 may include one or multiple parameters as part of the request. One (or more) of these parameters may include data that is subject to data sharing permissions. As noted above, these data sharing permissions may be explicitly specified as part of another parameter in the service interface or may be determined from a profile, account, configuration, or other information associated with the service interface request 130 which may specify data sharing permissions. In order to trace the movement of this data in the parameter subject to data sharing permissions, a token, such as token 132 may be included in place of the data. As discussed in detail below with regard to FIGS. 4 and 5, the token may be generated to include or otherwise describe various information such as input data context 133, share permissions 134, and the interface identity 135 (as the entry point or origin of service interface request 130). Token 132 may be formatted to fit or otherwise conform to a format of the parameter. For instance, token 132 may be formatted as a string of a certain length according to a specification of the parameter as a string of the certain length.

Once included in service interface request 130 and submitted to service 111, the token may provide the basis for tracing the movement of the data in the parameter that may be subject to data sharing permissions 134. Non-token input data could then be shown to follow a same movement path if subject to the same data sharing restrictions. For example, the data may be shared along the bolded path 113 between different services (e.g., of a provider network like provider network 200 in FIG. 2). Note that in some embodiments, any one location along path 113 may also be an external service, system, or device, including Internet of Things (IoT) devices or other connected devices which may not be implemented within or a service a provider network. Thus, tracing is enabled within a provider network or in addition external to the provider network. Sharing data may include storing the data in data store with other data, combining or using the data with other data as inputs to operations (or used to generate inputs to other operations, such as using the data as the basis for an input encoding of features to a machine learning model implemented at one of the services), or otherwise moving the data along to other services. Data sharing permissions may be determinative of when and/or what type data sharing is permitted.

For each movement between services, a report of trace data 124 may be sent to a data sharing permission compliance management system 120. Data sharing permission compliance management system 120 may be a stand-alone system (e.g., a $3^{rd}$ party system to a provider network, or may be implemented as part of a provider network, as data sharing permission compliance management service 210 discussed below with regard to FIGS. 2-8). As discussed in detail below with regard to FIG. 6, a monitor or other component implemented at each recipient location of the data along path 113 may identify the data as a token for data share tracing. Decoding the token may obtain information used to generate the report of trace data 124. For example, the report of trace data may use the share permissions 134 to verify whether data sharing enforcement at that location (e.g., service) as compared with the share permissions is correct. In some embodiments, decoded data may still not be human-readable (though further decoding, mapping, or translation can be applied to make it human-readable to include in various reports or communications). In other embodiments, decoded data may be human-readable.

Figure 7:
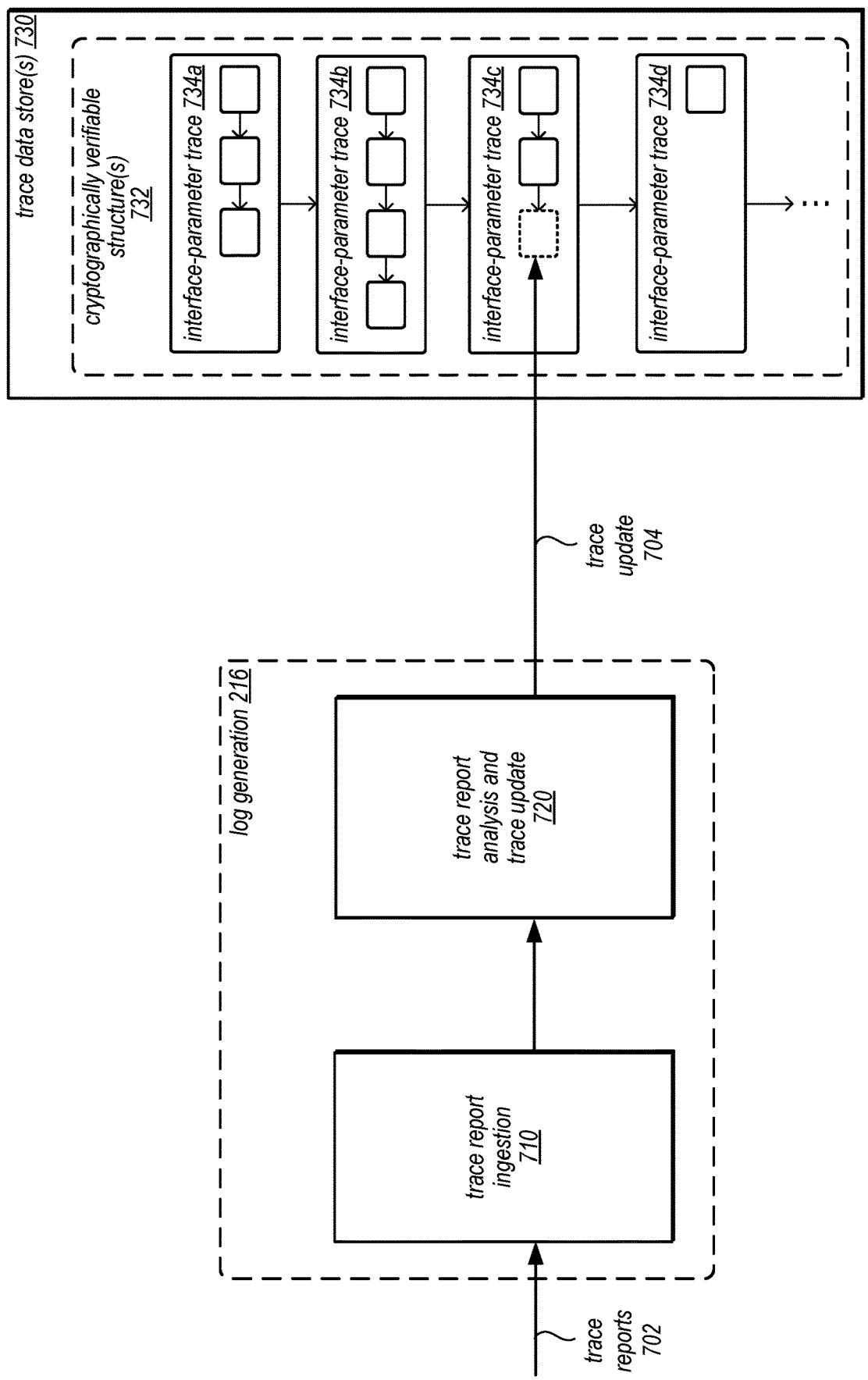
FIG. 7 is a logical block diagram illustrating log generation for data sharing permission traces, according to some embodiments.

As discussed in detail below with regard to FIG. 7, trace data reports for the different locations on the path 113 may be used to generate the data share permission trace for a parameter-interface, as indicated at 122. In some embodiments, the trace 122 may be a log of each movement as well as the data share permission verification information determined from reports 124. In some embodiment, the data structure for the data share permission trace for the parameter-interface may use various cryptographic techniques (e.g., hash-based cryptography) to ensure that the trace is an append only log where movements and data share permission verification information are appended for each new location and the prior records in the log cannot be altered.

As discussed in detail below with regard to FIG. 8, trace 122 may be shared with various client applications for different analyses, including data sharing permission compliance analysis 150. Data sharing permission compliance analysis 150 may implement various rule sets or other criteria to provide automated reasoning over trace 122 (as well as other traces that may be obtained for other parameter-interfaces) to verify correctness of data sharing along a movement path, such as to verify existence of positive proof of permitted sharing and to verify existence of negative proof that un-permitted sharing does not occur. Data structures, such as a cryptographically verifiable data structure as discussed below with regard to FIG. 7, may be used in some embodiments to maintain traces, like trace 122, in order to provide evidence for determining satisfaction of various regulatory or other compliance schemes that can be independently verified as correct.

Previous descriptions are not intended to be limiting, but are merely provided as a logical example of scenarios where data sharing tracing may be implemented across different inter-service locations may be implemented.

This disclosure continues with a general description of a provider network, which may implement a data sharing permission compliance management service that performs tracing data share permission enforcement of parameters through service interfaces in services in the provider network. Various examples of a provider network, monitoring service, network-based services and clients are discussed, including different components/modules, or arrangements of components/module that may be employed as part of a monitoring service. A number of different methods and techniques to implement tracing data share permission enforcement of parameters through service interfaces are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
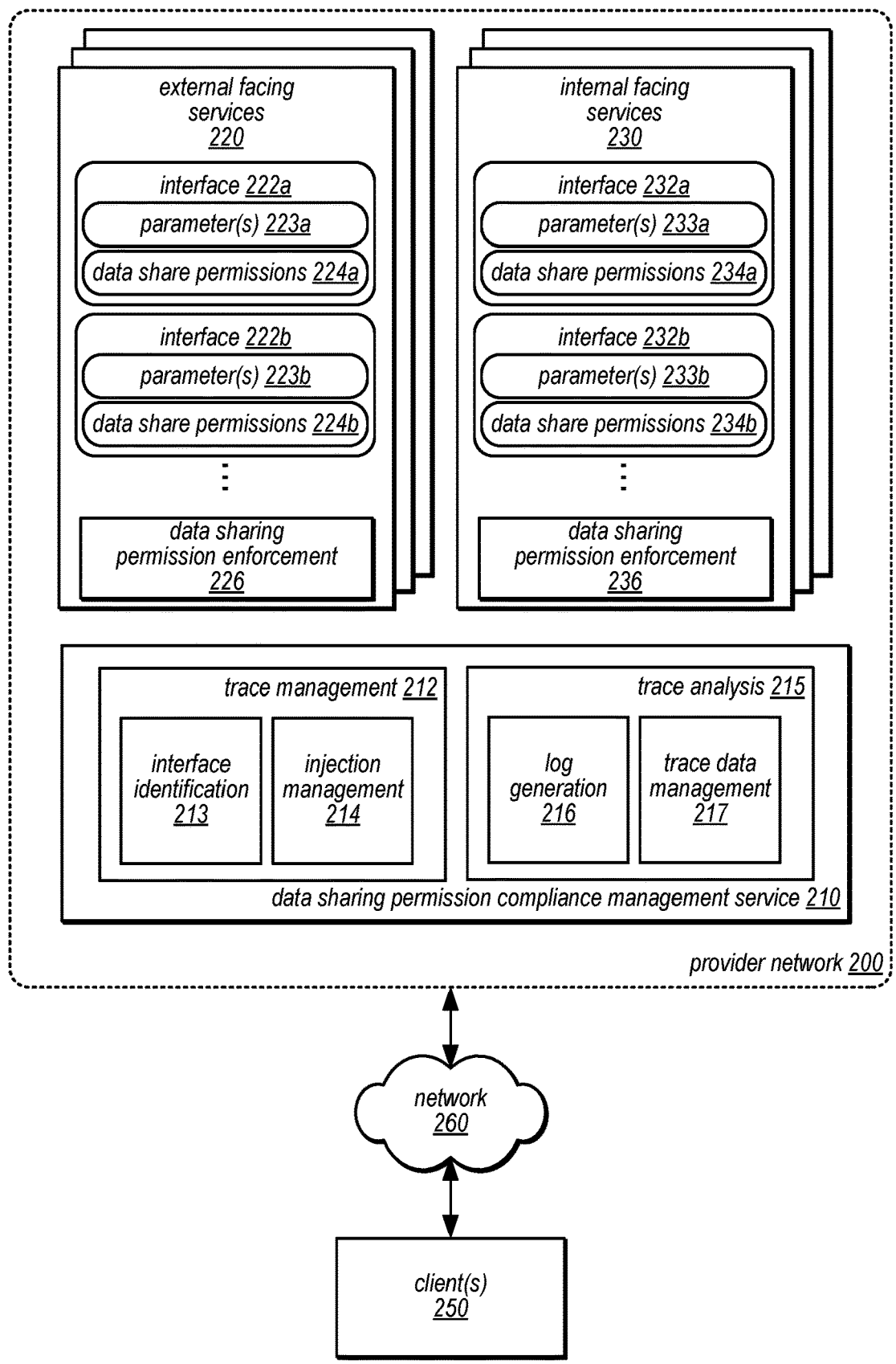
FIG. 2 is block diagram illustrating a provider network that implements multiple different network-based services for clients, including a data sharing permission compliance management service, according to some embodiments.

FIG. 2 is block diagram illustrating a provider network that implements multiple different network-based services for clients, including a data sharing permission compliance management service, according to some embodiments. Provider network 200 may be set up by an entity such as an individual, a company or an organization, public sector or private, to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may be organized into different regions, data centers, or other collections of devices to implement the services offered by provider network 200. Clients 250 may be configured to access via network 260 network-based services implemented as part of provider network 200 to perform various tasks, implement various systems, functions, or applications.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 12 and described below. In some embodiments, the functionality of a given system or service component (e.g., a component of data sharing permission compliance management service 210, external facing services 220 and internal facing services 230) may be implemented by a particular node or may be distributed across several nodes. In some embodiments, a given node may implement the functionality of more than one service system component (e.g., more than one data store component).

Provider network 200 may implement many different kinds of services, and thus the following discussion of various services is not intended to be limiting. For example, various external facing services 220, which may be accessible via network 260 to client(s) 250 and internal facing services 230, which may be implemented for the performance of internal tasks or operations to support provider network 200 and other services of provider network 200, such as external services. In some scenarios, external services 220 may act as internal services for other external services in some embodiments (e.g., a database service may be publicly accessible but also used to support an e-commerce service). Services 220 and 230 may include a variety of computational and consumer resources, such as e-commerce services, payment services, media services, deployment service(s) for computing resources, management service(s) for computing resources, application service(s), analytic service(s), storage service(s), database service(s), networking service(s), virtual computing service(s) to provide computing resources offered to clients in units called "instances," "containers" or other virtualization schemes, services to coordinate the metering and accounting of client usage of network-based services, financial accounting and billing service(s) for client usage, and services for user authentication and access control procedures, among other services.

Both external facing services 220 and internal facing services 230 may implement one or multiple interfaces, such as interfaces 222a and 222b for external facing services and interfaces 232a and 232b for internal facing services 230. These interfaces may include one or multiple input parameters respectively, such as parameters 223a, 223b, 233a, and 233b. Some of the data in these parameters may be subject to data share permissions, such as data share permissions 224a, 224b, 234a, and 234b respectively, which may indicate when and what data sharing for the data input as a parameter may be permitted or not permitted. Both external facing services 220 and internal facing services 230 may implement respective data sharing permission enforcement features, 226 and 236, which may implement various control techniques to enforce data sharing permissions (e.g., separate storage structures, access restrictions on data, alternative features or workflows, and so on).

In various embodiments, provider network 200 may implement data sharing permission compliance management service 210. Data sharing permission compliance management service 210 may offer various features for centralized visibility into the movement of data within provider network (and in some embodiments external provider network movements) that is received with data sharing permissions to be enforced. As discussed in detail below with regard to FIGS. 3-5, trace management 212 may be used to cause identify which traces to perform and cause performance of the traces. As discussed in detail below with regard to FIGS. 6-8, the generation of data sharing permission traces may be implemented by trace analysis 215, according to some embodiments.

Clients 250 may encompass any type of client configurable to submit requests to provider network 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260, such as search requests to obtain data sharing permission traces as discussed below with regard to FIG. 8. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with network-based service using a private network rather than the public Internet.

Figure 3:
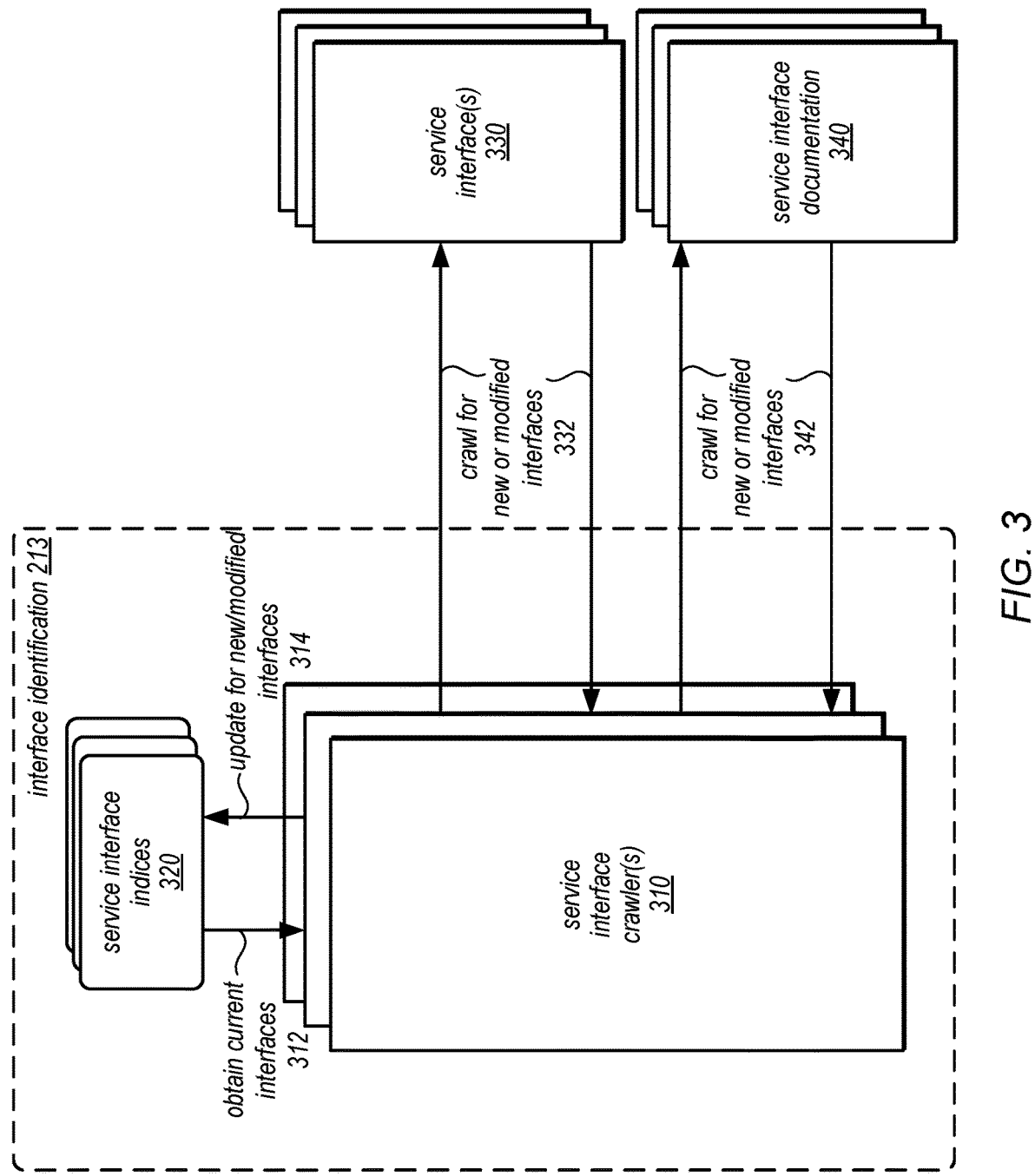
FIG. 3 is a block diagram illustrating interface identification for performing data sharing permission tracing, according to some embodiments.

In provider networks, development of new services and changes to existing services may proceed independently. Changes to existing services may change the movement of data between services, including data subject to data sharing permissions. New services may also use and move data subject to data sharing permissions. In order to ensure that data sharing permission traces are current with the movement data in such a dynamic environment, techniques to identify when new interfaces (as part of new services or as modifications to existing services) or modifications to existing interfaces are available may be performed. FIG. 3 is a block diagram illustrating interface identification for performing data sharing permission tracing, according to some embodiments.

Interface identification 213 may be implemented as part of trace management 212 in data sharing permission compliance management service 210. Interface identification 213 may implement various techniques to detect new interfaces or modifications to interfaces. For example, interface identification 213 may maintain service interface indices 320. Service interface indices 320 may describe the set of current interfaces available, and thus may provide a listing of parameter-interface combinations to be traced. Additionally, service interface indices 230 may be used as an authoritative source for detecting new or modified interfaces. For example, service interface crawler(s) 310 may be implemented (e.g., as nodes or processes on host systems of provider network 200) which may execute various probing, scraping, or other data collection techniques to crawl 332 with respect to service interface(s) 330 and to crawl 342 with respect to service interface documentation 340.

For example, service interface crawler(s) 310 may read web page metadata, html code, or other exposed information for service interface(s) 330 which may indicate the features of interfaces, including the parameters of the interface. This obtained data may then be compared with current interfaces 312 obtained from service interface indices 320 to detect new or modified interfaces at 330. Similarly, API specifications, feature announcements on blog posts, or various other text descriptions of service interfaces can be accessed and analyzed to compare with current interfaces 312.

When a new or modified interface is discovered, then an update to service interface indices 320 is made, as indicated at 314. For example, a new entry is inserted for a new interface (or a new index created for a new service). Parameters, including a parameter which may input data subject to data sharing permissions may be identified, in some embodiments. For modified interfaces, an existing entry may be modified to correspond to the detected changes to the interface, including changes to parameters, such as parameters that may be subject to data sharing permissions.

Figure 4:
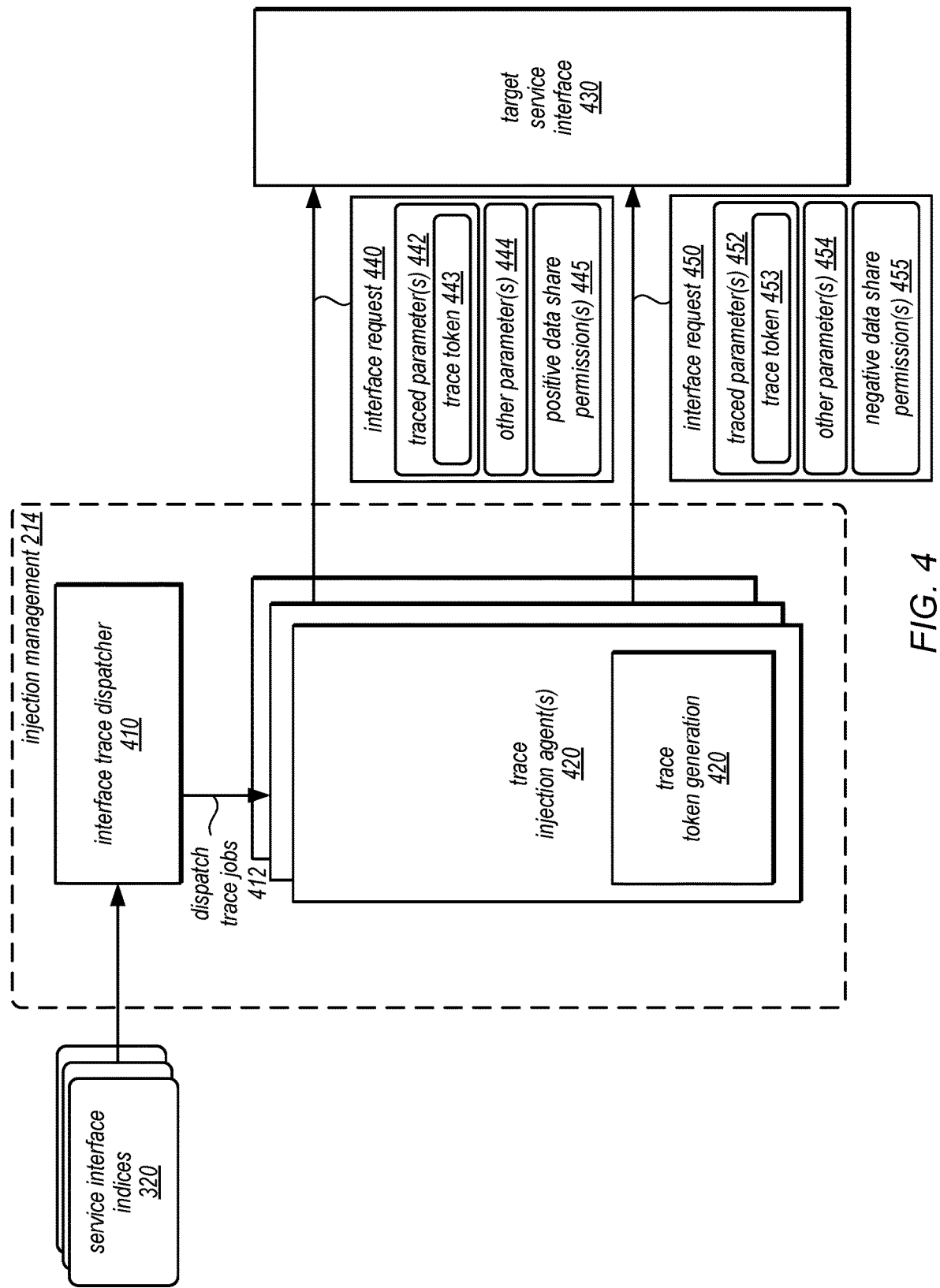
FIG. 4 is a logical block diagram illustrating injection management for including tokens for tracing data share permissions in interface requests, according to some embodiments.

The discovery of interfaces, new or modified, may be used to initiate tracing to ensure that data sharing permission trace information is current with the interfaces of a provider network. FIG. 4 is a logical block diagram illustrating injection management for including tokens for tracing data share permissions in interface requests, according to some embodiments. Service interface indices 320 may be used to obtain new or modified interfaces for tracing. For example, a change log or update event indication may be provided (e.g., by interface identification 213) to interface trace dispatcher 410. In response, interface trace dispatcher 410 may obtain the information of the new or modified interface from service interface indices 320 (e.g., obtain the parameter subject to data sharing permissions and interface identifier from a corresponding entry).

Interface trace dispatcher 410 may dispatch trace jobs to different trace injection agents 420. Trace injection agents 420 may be implemented as nodes or processes on host systems of provider network 200 and may include trace token generation 420 to generate trace tokens to include in interface requests. Trace token generation 420 use a trace token format as illustrated in FIG. 5, in some embodiments.

Figure 5:
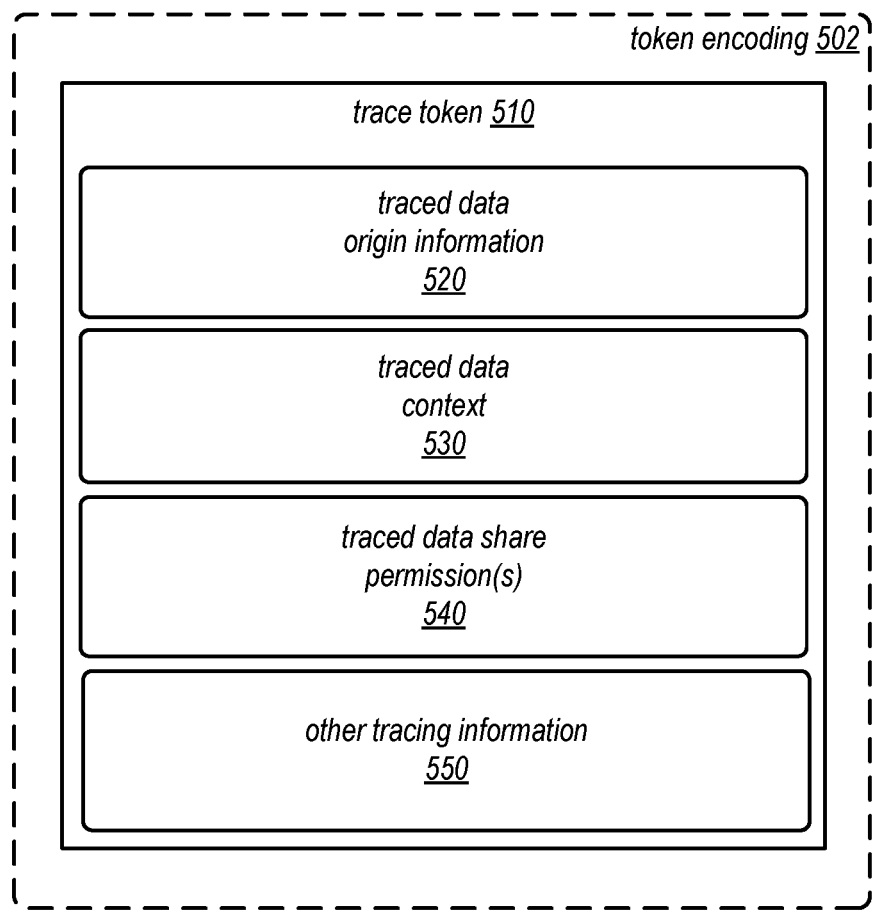
FIG. 5 is a logical block diagram illustrating a trace token format, in some embodiments.

As depicted in FIG. 5, trace token 510 may be describe various information for trace reporting and other analysis features. In some embodiments, trace token 510 may include the traced data origin information 520. For example, an identifier or other descriptor of the initial, entry point for the traced data may be an identifier or descriptor of the interface and service of the interface in some embodiments. Preserving traced data origin information 520 may establish an accurate lineage or path of data movement. In some embodiments, trace token 510 may include trace data context 530. Trace data context 530 may include other features (e.g., parameters) descriptive of the interface, such as a type of interface or type of action for the service, and/or descriptive of other input parameters, such as field names for other parameters.

In some embodiments, trace token 510 may include traced data share permissions 540. For example, negative permissions that restrict some or all data sharing may be included. In another example, positive permissions may allow some or all data sharing. In some embodiments, trace token 510 may include various other tracing information 550, such as interface version information, a timestamp for the beginning of the trace injection, or various other information that can be used as part of analysis of a data sharing permission trace.

As indicated at 502, a token encoding may be applied to trace token 510. For example, a hash function may be applied to concatenated information (e.g., 520+530+540+550) in trace token 510 to perform a lossless encoding on trace token 510. In some embodiments, a size or data type of encoded trace token 510 may conform to the format of the parameter in which the trace token 510 is being injected. Thus, trace token generation 420 may generate different sized or typed trace tokens according to the respective parameters being traced, in some embodiments.

Returning to FIG. 4, trace token generation 420 may generate trace tokens for inclusion in interface requests 440 and 450 to be submitted via the target service interface 430 (e.g., indicated in the dispatched trace job 412). For example, interface request 440 may be assembled where traced parameter(s) 442 have trace token 443 included as the respective parameters 442. Note that in some embodiments, multiple trace tokens may be included for multiple traced parameters in a single interface request 440. Some other parameter(s) 444 for the target service interface 430 which are not being traced may also be included with, for example test or dummy values. Trace jobs 412 may include trace testing for both positive and negative data share permissions. For instance, while interface request 440 has positive data share permission(s) 445 (e.g., allowing some or all data sharing for the data represented by the trace token 443), another interface request 450 may have traced parameter(s) 452 with trace token 453, other parameter(s) 454, and negative data share permission(s) 455 (e.g., blocking some or all data sharing for the data represented by the trace token 453). In this way verification of the parameter-interface for both positive and negative permissions may be traced. Note that corresponding permissions in trace token 443 and trace token 453 may also be included (as discussed above with regard to FIG. 5).

Figure 6:
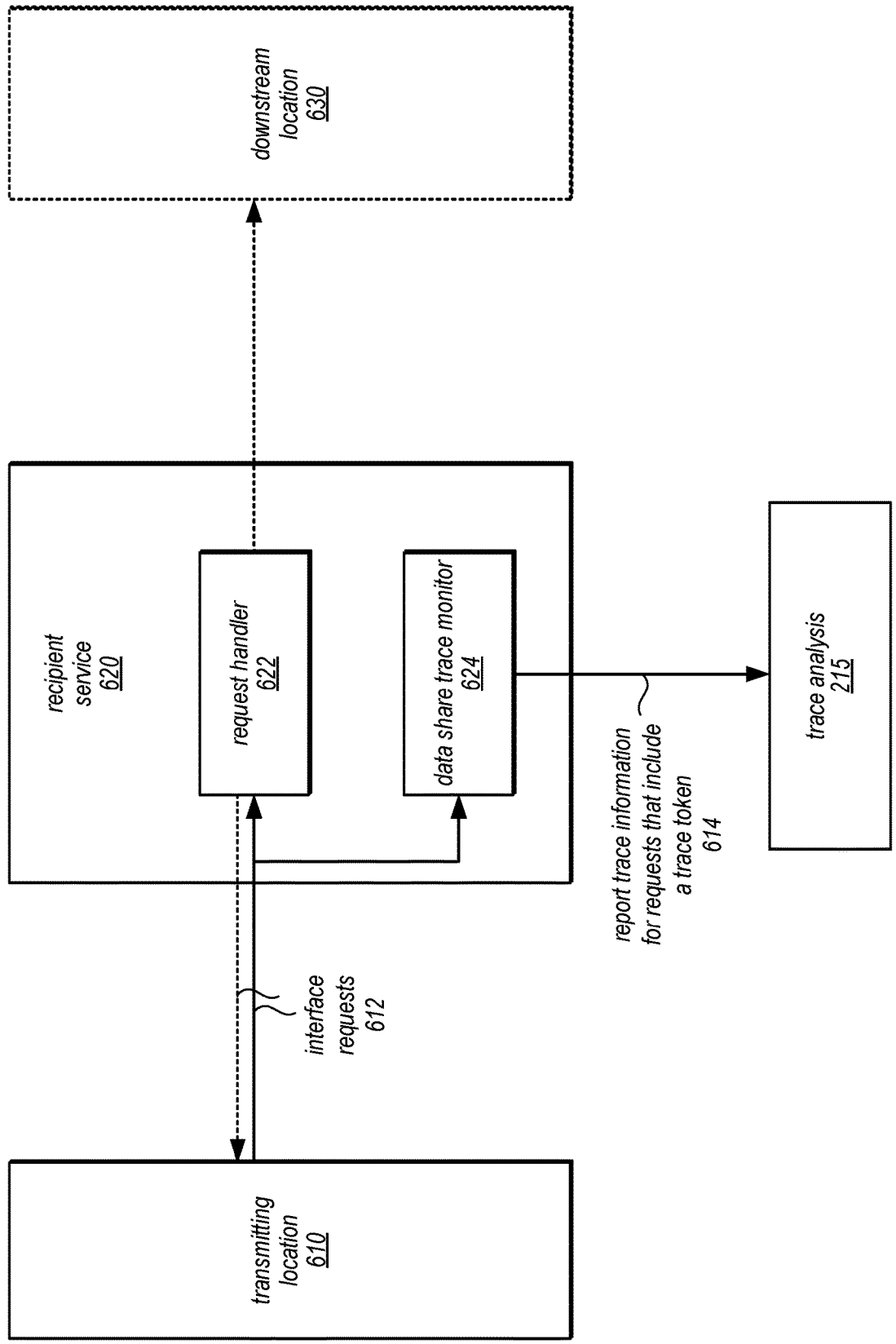
FIG. 6 is a logical block diagram illustrating a data share trace monitor at a location in a movement path of data, according to some embodiments.

Once trace tokens are injected as a parameter of an interface request, then the path of the data represented by the trace token may move in accordance with the various operations, logic, workflow, tasks, or other interactions or dependencies between services (and/or external to provider network systems, services, or devices). Capturing trace information using the token may be performed on-location at the various locations along a movement path using, in some embodiments, a data share trace monitor. FIG. 6 is a logical block diagram illustrating a data share trace monitor at a location in a movement path of data, according to some embodiments.

As illustrated in FIG. 6, transmitting location 610 may respond to or submit interface requests 612 to recipient service 620 which may include the trace token. Transmitting location 610 may be another service of a provider network or a system, service, or device that is external to a provider network implementing recipient service 620. Because trace tokens stand in for the data of a parameter, trace tokens may easily move to any location along a data movement path without requiring that location to implement special handling to move the traced data represented by the trace token.

Recipient service 620 may include request handler 622, which may perform various operations in accordance with interface requests 612 (e.g., process, read, or store the trace token). These operations performed by request handler 622 may, in some scenarios, be data sharing operations that are performed as permitted by share permissions for the data represented by the trace token. For example, the share permissions may also be included in interface requests 612 which may allow request handler 622 to determine what data sharing operations are permitted. In some embodiments, the presence of the data may itself be an indication of positive data sharing permission (as in some scenarios data which cannot be shared should not be received at recipient service 620). In some scenarios, request handler 622 may move the data further along to downstream location 630 (although it may not in other scenarios as indicated by the dotted lines).

Recipient service 620 may implement data share trace monitor 624, in some embodiments. Data share trace monitor 624 may be a daemon or other hosted process at recipient service 620 (e.g., on a same host system as request handler 622 or a separate host system of recipient service 620). Data share trace monitor 624 may receive a copy or indication of an interface requests 612, monitoring interface requests 612 for the presence of trace tokens. A trace token may be identified when applying a decode technique to the data in a parameter of interface requests 612 and the decoded data matches or corresponds to the trace token format (as illustrated above with regard to FIG. 5), in some embodiments. In some embodiments, a signature or other identifier may be included in trace tokens which indicates to data share trace monitor 624 that the decoded data is a trace token.

For identified trace tokens, data share trace monitor 624 may generate and report trace information for requests that include trace token, as indicated at 614. For example, the trace information may include a result of a comparison between the data share permissions included in the trace token and the presence of data sharing (if any) of the data of the trace token at recipient service 620. A correct enforcement of data sharing permissions or incorrect enforcement of a data sharing permissions may be included in the reported comparison. Correct enforcement of data sharing may include both positive proof (e.g., data sharing was permitted and data sharing occurred) and negative proof (e.g., data sharing was not permitted and data sharing did not occur). Other information may also be included in trace information, such as a timestamp or other indication of when the trace token was received. In some embodiments, context information and/or origin information from a trace token may be used to tag or otherwise enrich the reported trace information. For example, a region-specific point of entry interface or version number of the point of entry interface may be included in the report trace information. In this way, a trace specific to a region's interface can be identified from data sharing permission traces to support analyses and confirmation of compliance for region-specific compliance schemes. In some embodiments, data share trace monitor 624 can append data to trace token (but not modify the trace token's current contents) in order to add further information for trace reporting at further movement path locations.

Trace reports may be provided along various locations of a movement path for the trace token, representing the movement path of data between services (and other types of locations). Trace reports may be made for many different traces being conducted and aggregated and stored for future analysis as part of a log or other collection. FIG. 7 is a logical block diagram illustrating log generation for data sharing permission traces, according to some embodiments.

Log generation 216 may support trace analysis 215 by processing trace reports 702 received from a variety of locations for updates 704 to trace data store(s) 730. For example, log generation 216 may implement trace report ingestion 710. Trace report ingestion 710 may use information included in trace reports to identify a particular data sharing permission trace to which the trace report corresponds. For example, a unique trace identifier may be included in (or derived from) information in each trace token which can then be used to identify a data sharing permission trace for a particular interface-parameter combination. In some embodiments, trace report ingestion 710 may implement various formatting techniques to extract information from trace reports 702 for processing at trace report analysis and trace update 720. Trace report ingestion 710 may apply or enforce ordering on trace reports 702 for a same trace, including the application of deduplication or other techniques that ensure a single trace report per location for a trace is provided to trace report analysis and trace update 720 and that the trace reports are provided in order of the communication path (e.g., based on timestamp values for the trace reports or information indicating transmitting locations to the reporting location).

Trace report analysis and trace update 720 may be implemented in order to generate trace log records or other entries in for the specific interface-parameter trace, such as interface parameter trace 734*c*, that include the information used for various subsequent analyses, including positive proof, negative proof, or evidence of data sharing permission violations as identified by trace reports 702. As multiple different interface-parameter traces, 734*a*, 734*b*, 734*c*, 734*d*, and so on, may be collected, trace report analysis and trace update 720 may be able to identify and perform trace update 704 to a correct interface-parameter trace (e.g., based on the trace identifier determined above). Although not illustrated, in some embodiments trace report and analysis 720 may send reports, warnings, or trigger remedial actions in the event a violation of data sharing permissions are detected.

Trace data store(s) 730 may support storing of interface parameter-traces 734 in a single (or collection of) cryptographically verifiable structure(s) 732. A cryptographically verifiable structure 732 may include various cryptographic features, such as hash function generated hash values, signature-based encryption, or various other encryption features that provide for independent verification that contents of cryptographically verifiable structures have not been changed once added (e.g., that interface parameter trace 734 records are not modified after creation). Examples of cryptographically verifiable structures include, but are not limited to, hash chains, block chains or other distributed ledgers, that provide a transparent, immutable, and cryptographically verifiable transaction log(s). For example, interface-parameter traces 734 may have internal chaining of records for a particular trace as well as trace-to-trace chaining as illustrated in FIG. 7. Thus, trace updates 704 may be made to cryptographically verifiable structure(s) consistent with the update criteria enforced to maintain cryptographically verifiable structure(s) 732.

Once stored data sharing permission traces may be useful for many different applications and analyses. FIG. 8 is a logical block diagram illustrating interactions for logged trace data at trace data management, according to some embodiments. Trace data management 217 may provide an interface for accessing trace data store(s) 730 and cryptographically verifiable structures 732 to obtain the data sharing permission traces for different interface-parameter combinations 734. For example, trace data management 217 may implement APIs, queries, or other programmatic interfaces to request specific portions or the entirety of traces 734. For example, range requests may specify a group of interface-parameter traces according to time ranges in which the traces were collected. Other requests supported may identify a particular service, service interface, or service interface-parameter combination. In this way, different granularities of trace data can be obtained for a variety of different applications and use cases. In some embodiments, the entirety of the cryptographically verifiable structure(s) 732 may be provided in response to a request.

Figure 8:
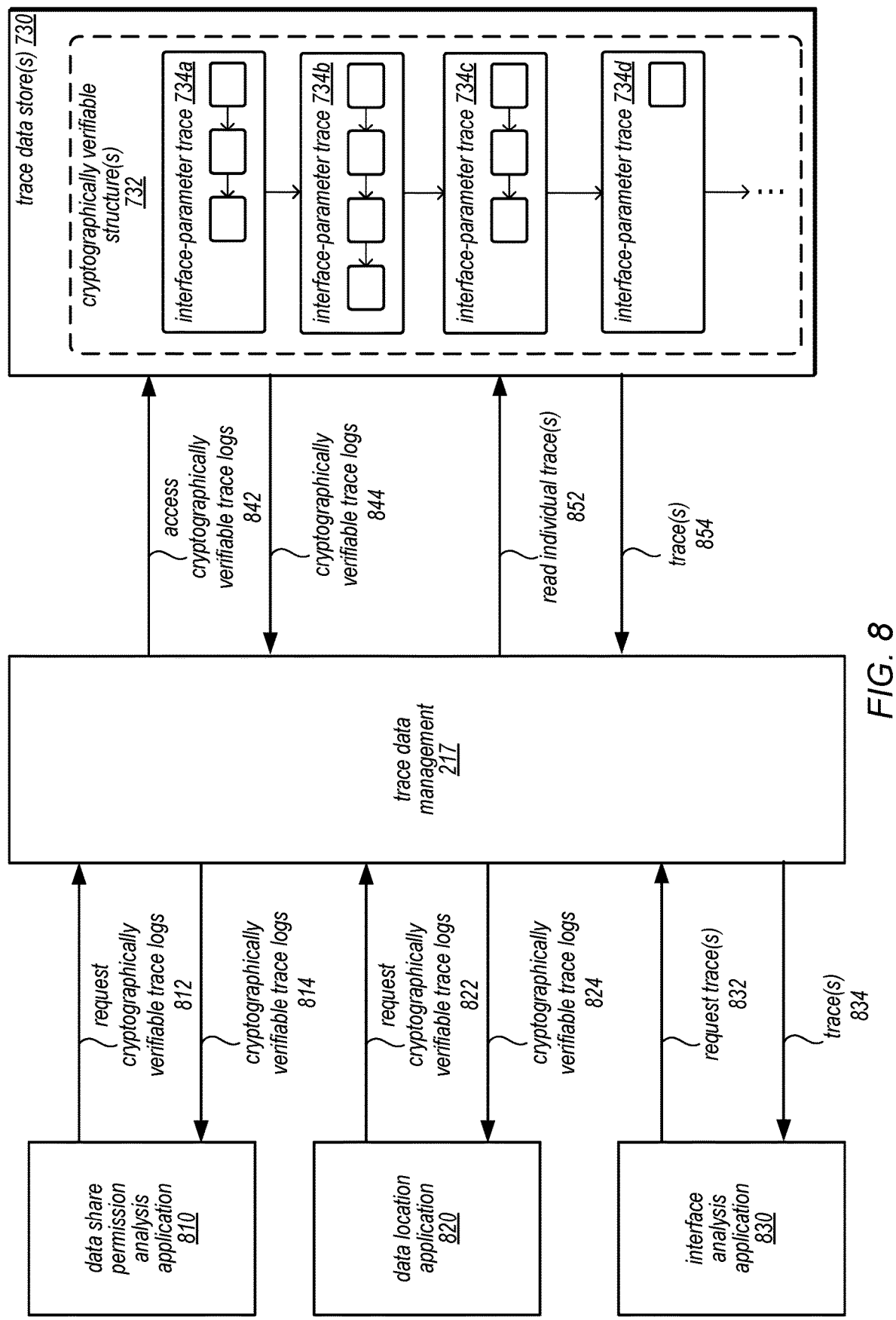
FIG. 8 is a logical block diagram illustrating interactions for logged trace data at trace data management, according to some embodiments.

As illustrated in FIG. 8, different types of client applications may interact with trace data management 217. One example is a data share permission analysis application 810. Data share permission analysis application 810 may send a request for cryptographically verifiable trace logs 812. Trace data management 217 may access cryptographically verifiable trace logs 842 and obtain them, as indicated at 844, and return them as indicated at 814. Data share permission analysis application 810 may implement techniques to verify the correctness of the data of interface-parameter traces 734, using the supported cryptographic verification techniques described for cryptographically verifiable structures. Once verified, data share permission analysis application 810 may implement automated reasoning through various rules, criteria, or other techniques to analyze the interface parameter traces to determine the correct enforcement of data sharing permissions for given input data to an interface. For example, the automated reasoning may check for positive proof and/or negative proofs of data sharing enforcement along the movement paths described the different traces. In this way, an exhaustive and formal verification of correct data sharing enforcement may be provided by data share permission analysis application 810 (e.g., to end users of data share permission analysis application 810 for auditing or other compliance purposes).

In another example, data location application 820 may send a request for cryptographically verifiable trace logs 822. Trace data management 217 may access cryptographically verifiable trace logs 842 and obtain them, as indicated at 844, and return them as indicated at 824. Data location application 820 may provide an exhaustive data location analysis in order to locate potential locations for data that has been identified for deletion. For example, right-to-be-forgotten policies or other data deletion requirements may involve understanding where data input through an interface has been or currently is located. Interface parameter traces 734 for those input parameters may be used to determine the locations in which data deletion should be performed.

In another example, interface analysis application 830 may request specific trace(s) 832. Trace data management 217 may read individual trace(s) 852 from trace data store(s) 730 and return them, as indicated at 854 and 834. Trace(s) 834 may include various interface performance information, such as timestamp values indicative of throughput, latency or other characteristics of data movement between services. Hidden dependencies, bottlenecks, or other performance conditions for an interface (or group of interfaces for a service) may be analyzed using the trace information 834.

Figure 9:
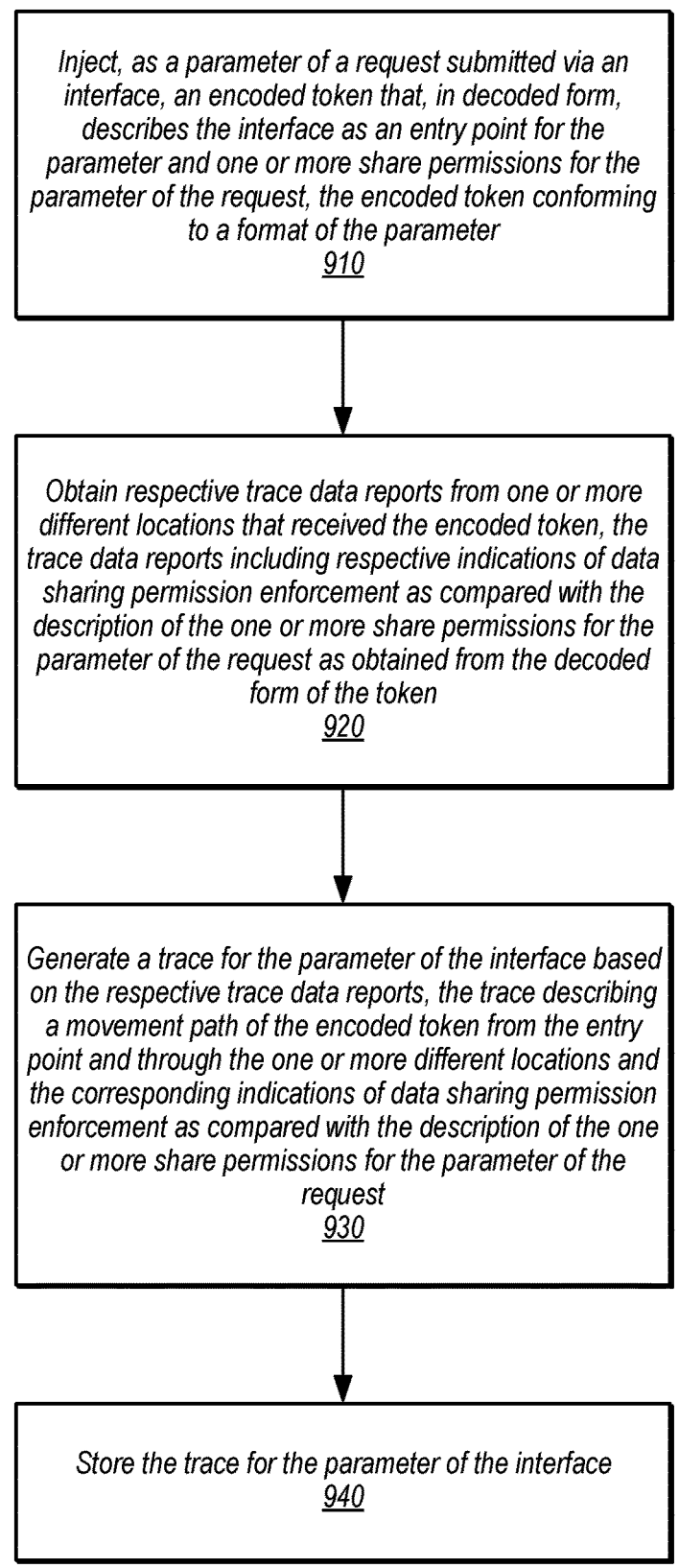
FIG. 9 is a high-level flowchart illustrating various methods and techniques for tracing data share permission enforcement of parameters through service interfaces, according to some embodiments.

Although FIGS. 2-8 have been described and illustrated in the context of a data sharing permission compliance management service, the various components illustrated and described in FIGS. 2-8 may be easily applied to other applications, systems, or services that may. As such, FIGS. 2-8 are not intended to be limiting as to other embodiments. FIG. 9 is a high-level flowchart illustrating various methods and techniques for tracing data share permission enforcement of parameters through service interfaces, according to some embodiments. Various different systems and devices may implement the various methods and techniques described below, either singly or working together. For example, a data sharing permission compliance management service, such as described above with regard to FIGS. 2-8 may implement the various methods.

Alternatively, a combination of different systems and devices may implement the described techniques. Therefore, the above examples and or any other systems or devices referenced as performing the illustrated methods, are not intended to be limiting as to other different components, modules, systems, or configurations of systems and devices.

As indicated at 910, an encoded token may be injected as a parameter of a request submitted via an interface, in some embodiments. In decoded form, the encoded token may describe the interface as an entry point for the parameter and one or more share permissions for the parameter of the request, in some embodiments. For example, as discussed above with regard to FIG. 5, the encoded token may include an identifier or other indication of the entry point. Other information may be included in the encoded token, also discussed above. Context information for the interface as well as other information which may be used for various types of analyses may be included. Various encoding techniques, such as hash-based encoding may be used. Moreover, the encoded token may conform with the format of the parameter (e.g., a string or numeric value within a certain size).

As indicated at 920, respective trace data reports may be obtained from different services or other locations, including external locations to a provider network. The trace data reports may include respective indications of data sharing permission enforcement as compared with one or more share permissions for the parameter of the request as obtained from the decoded form of the token. For example, as discussed above with regard to FIG. 6, negative proof may be obtained from some trace reports and positive proof may be obtained from other trace reports.

As indicated at 930, a trace for the parameter of the interface may be generated, in some embodiments. The trace may describe a movement path, such as the locations at which the encoded token was received, starting from the entry point described in the token and through the one or more different locations. The trace may describe the corresponding indications of data sharing permission enforcement as compared with the description of the one or more share permissions for the parameter of the request.

As indicated at 940, the trace for the parameter of the interface may be stored, in some embodiments. For example, a cryptographically verifiable data structure may store updates (e.g., log entries) to a trace as the trace reports are received, as discussed in detail above with regard to FIG. 7.

Figure 10:
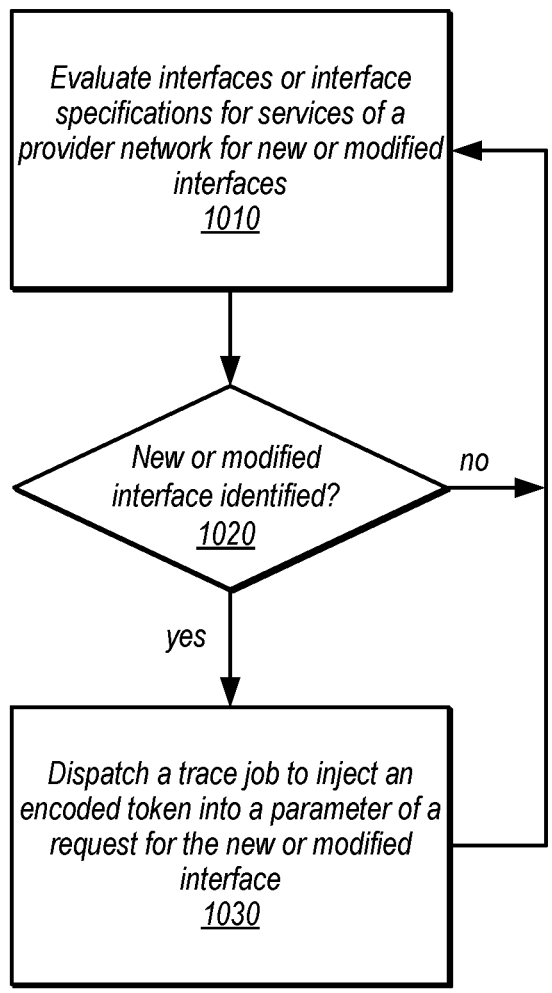
FIG. 10 is a high-level flowchart illustrating various methods and techniques for dynamically detecting interfaces for trace jobs, according to some embodiments.

FIG. 10 is a high-level flowchart illustrating various methods and techniques for dynamically detecting interfaces for trace jobs, according to some embodiments. As indicated at 1010, interfaces or interface specifications for services of a provider network may be evaluated for new or modified interfaces, in some embodiments. For example, as discussed above with regard to FIG. 3, one or more crawlers may be implemented which may perform various probing, scraping, or other data collection techniques to crawl service interface(s) and service interface documentation to detect. As indicated by the positive exit from 1020, new or modified interfaces may be detected. Then, as indicated at 1030, a trace job may be dispatched to inject an encoded token into a parameter of a request for the new or modified interface, in some embodiments. Tracking information for trace jobs may be updated to reflect the performance of the trace job, in some embodiments.

Figure 11:
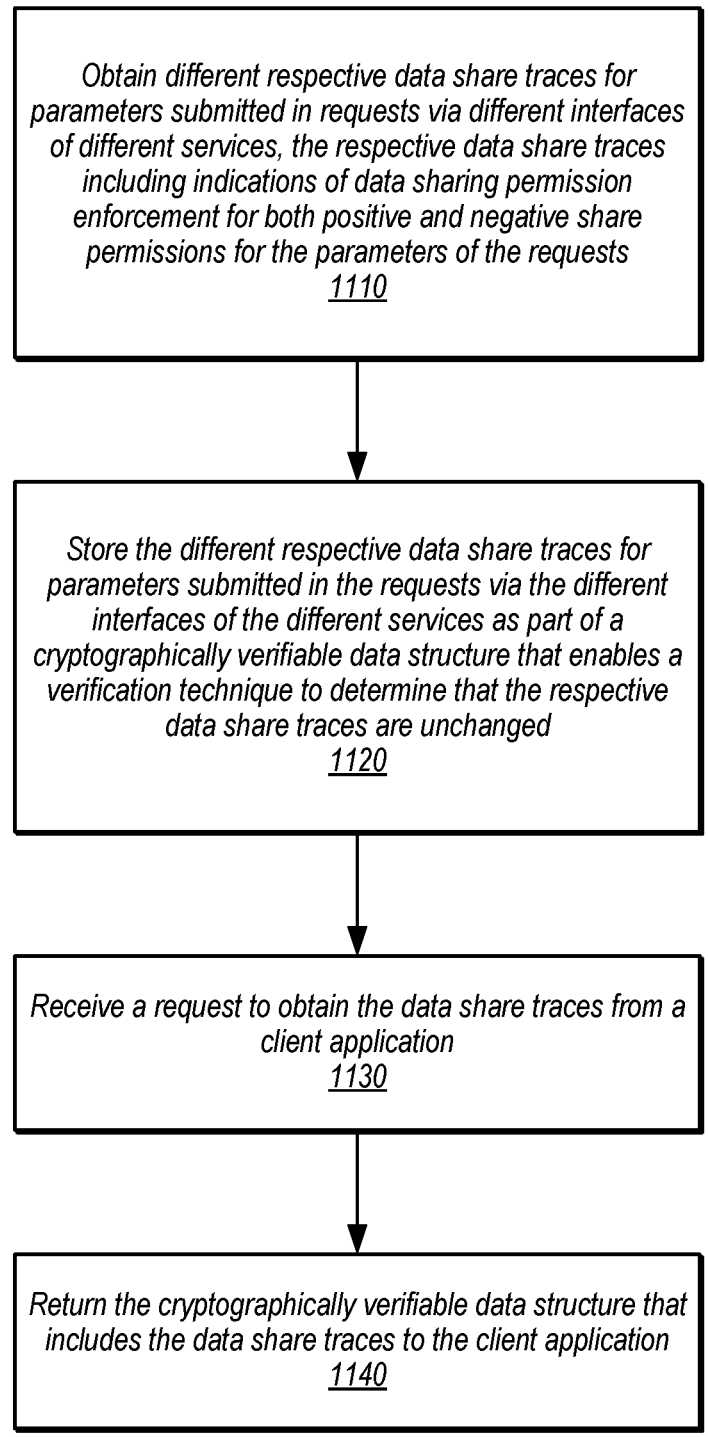
FIG. 11 is a high-level flowchart illustrating various methods and techniques to implement providing cryptographically verifiable traces of data share permission enforcement of parameters through service interfaces, according to some embodiments.

FIG. 11 is a high-level flowchart illustrating various methods and techniques to implement providing cryptographically verifiable traces of data share permission enforcement of parameters through service interfaces, according to some embodiments. As indicated at 1110, different respective data share traces for parameters submitted in requests via different interfaces of different services may be obtained, in some embodiments. The respective data share traces may include indications of data sharing permission enforcement for both positive and negative share permissions for the parameters of the requests, in some embodiments. In this way, testing for different data share permissions may be included in different respective traces for the interfaces.

As indicated at 1120, the different respective data share traces for parameters submitted in the requests via the different interfaces of the different services may be stored as a part of a cryptographically verifiable data structure that enables a verification technique to determine that the respective data share traces are unchanged, in some embodiments. For example, as discussed above with regard to FIG. 7, hash chains, block chains or other distributed ledgers, that provide a transparent, immutable, and cryptographically verifiable transaction log(s) may be used to implement cryptographically verifiable data structures, in some embodiments.

As indicated at 1130, a request to obtain the data share traces may be received from a client application, in some embodiments. For example, as discussed above with regard to FIG. 8, APIs, queries, or other programmatic interfaces to request specific portions or the entirety of traces may be supported. Different types of requests for data share traces may be supported, such as range requests that may specify a group of interface-parameter traces according to time ranges in which the traces were collected or other requests that identify a particular service, service interface, or service interface-parameter combination. In some embodiments, the entirety of the cryptographically verifiable structure may be provided in response to the request. As indicated at 1140, the cryptographically verifiable data structure that includes the data share traces may be returned to the client application, in some embodiments.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 12:
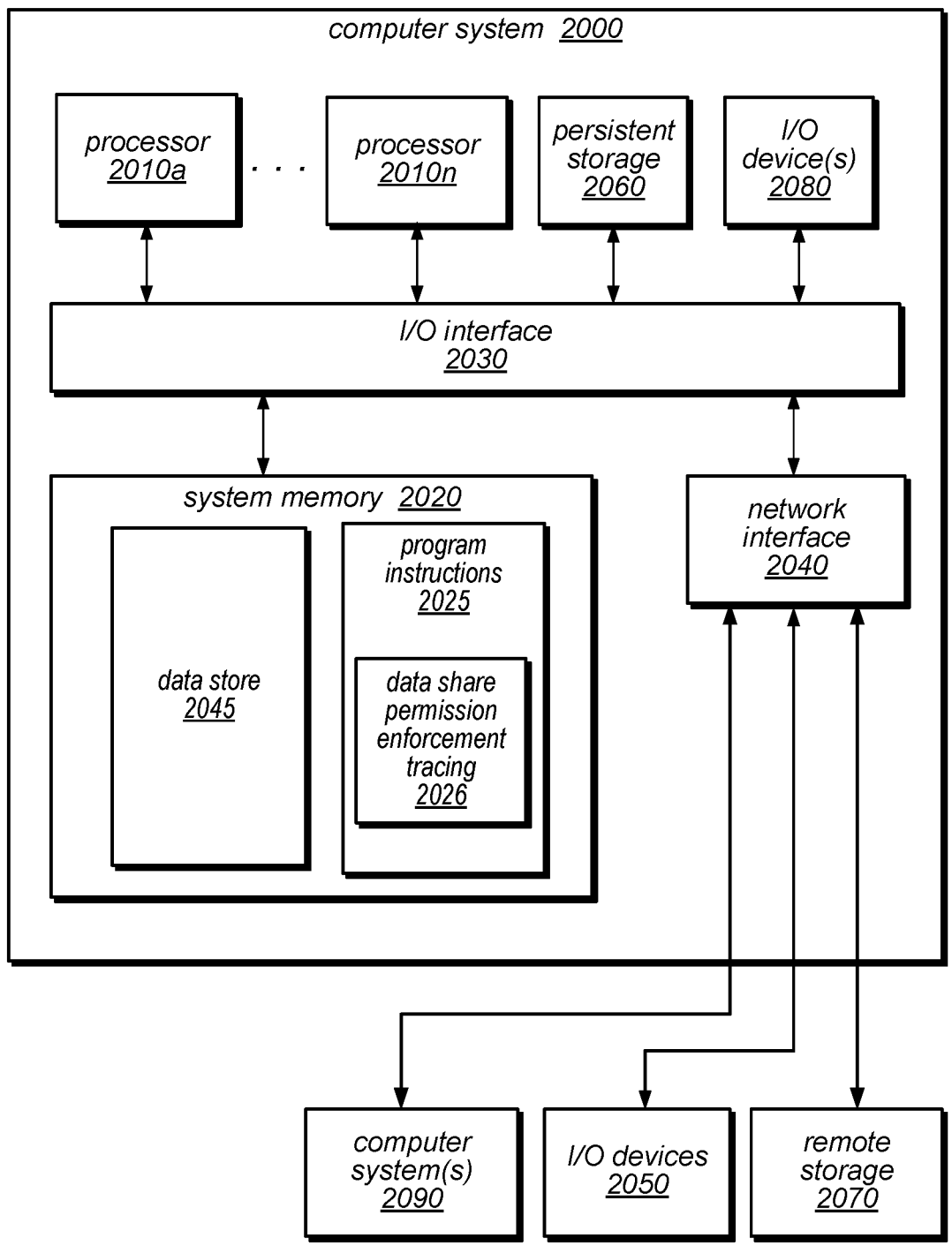
FIG. 12 is a block diagram illustrating an example computing system, according to some embodiments.

Embodiments of tracing data share permission enforcement of parameters through service interfaces as described herein may be executed on one or more computer systems, which may interact with various other devices. FIG. 12 is a block diagram illustrating an example computer system, according to various embodiments. For example, computer system 2000 may be configured to implement nodes of a provider network, network-based service, a data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein, such as data share permission enforcement tracing. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a service platform specific language engine, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a data share permission compliance management service of a provider network, configured to:
   obtain trace data reports for parameters submitted in requests via different interfaces of different ones of a plurality of services of the provider network;
   generate different respective data share traces for the parameters submitted in requests via the different interfaces of the different ones of the plurality of services of the provider network to indicate which respective inter-service data movement paths of the requests are taken between different services of the provider network out of a larger number of possible inter-service data movement paths, wherein the respective data share traces comprise indications of data sharing permission enforcement for both positive and negative share permissions for the parameter of the request;
   store the different respective data share traces for parameters submitted in the requests via the different interfaces of the different ones of the plurality of services as part of a cryptographically verifiable data structure, wherein the cryptographically verifiable data structure enables a verification technique to determine that the respective data share traces are unchanged;
   receive a request to obtain the data share traces from a client application; and
   return the cryptographically verifiable data structure that includes the data share traces to the client application.

2. The system of claim 1, wherein the trace data reports are generated based on encoded tokens injected in place of the parameters that respectively describe the different interfaces as entry points and data share permissions.

3. The system of claim 1, wherein the request specifies a range of time, and wherein the data share traces included in the cryptographically verifiable data structure are within the specified range of time.

4. The system of claim 1, wherein at least one of the data share traces was dispatched after detecting, by the data share permission compliance management service, that a corresponding one of the different interfaces was new or modified.

5. A method, comprising:
   obtaining, at a data share permission compliance management service, different respective data share traces for parameters submitted in requests via different interfaces of different ones of a plurality of services to indicate which respective inter-service data movement paths of the requests are taken between different services of the provider network out of a larger number of possible inter-service data movement paths, wherein the respective data share traces comprise indications of data sharing permission enforcement for both positive and negative share permissions for the parameters of the requests;
   storing, by the data share permission compliance management service, the different respective data share traces for parameters submitted in the requests via the different interfaces of the different ones of the plurality of services as part of a cryptographically verifiable data structure, wherein the cryptographically verifiable data structure enables a verification technique to determine that the respective data share traces are unchanged;

receiving, at the data share permission compliance management service, a request to obtain the data share traces from a client application; and returning, by the data share permission compliance management service, the cryptographically verifiable data structure that includes the data share traces to the client application.

6. The method of claim 5, wherein the different respective data share traces are determined from received trace data reports generated based on encoded tokens injected in place of the parameters that respectively describe the different interfaces as entry points and data share permissions.

7. The method of claim 5, further comprising:

receiving, at the data share permission compliance management service, a request to obtain one of the data share traces; and returning, by the data share permission compliance management service, the one data share trace.

8. The method of claim 5, wherein the request specifies a range of time, and wherein the data share traces included in the cryptographically verifiable data structure are within the specified range of time.

9. The method of claim 5, wherein the request specifies a specific service, and wherein the data share traces included in the cryptographically verifiable data structure are for interfaces of the specific service.

10. The method of claim 5, wherein at least one of the data share traces was dispatched after detecting, by the data share permission compliance management service, that a corresponding one of the different interfaces was new or modified.

11. The method of claim 5, wherein the different respective data share traces for parameters submitted in the requests via the different interfaces with tags associating the different respective data share traces for parameters submitted in the requests via the different interfaces with respective regions of the different interfaces.

12. The method of claim 5, wherein the plurality of services are offered by a provider network, and wherein at least one the data share traces includes a location external to the provider network.

13. One or more non-transitory, computer-readable storage media, storing program instructions that when executed on or across one or more computing devices cause the one or more computing devices to implement:

generating, at a data share permission compliance management service, different respective data share traces for parameters submitted in requests via different interfaces of different ones of a plurality of services to indicate which respective inter-service data movement paths of the requests are taken between different services of the provider network out of a larger number of possible inter-service data movement paths, wherein the respective data share traces comprise indications of data sharing permission enforcement for both positive and negative share permissions for the parameters of the requests;

storing, by the data share permission compliance management service, the different respective data share traces for parameters submitted in the requests via the different interfaces of the different ones of the plurality of services as part of a cryptographically verifiable data structure, wherein the cryptographically verifiable data structure enables a verification technique to determine that the respective data share traces are unchanged;

receiving, at the data share permission compliance management service, a request to obtain the data share traces from a client application; and returning, by the data share permission compliance management service, the cryptographically verifiable data structure that includes the data share traces to the client application.

14. The one or more non-transitory, computer-readable storage media of claim 13, wherein the different respective data share traces are determined from received trace data reports generated based on encoded tokens injected in place of the parameters that respectively describe the different interfaces as entry points and data share permissions.

15. The one or more non-transitory, computer-readable storage media of claim 13, further comprising:

receiving, at the data share permission compliance management service, a request to obtain one of the data share traces; and returning, by the data share permission compliance management service, the one data share trace.

16. The one or more non-transitory, computer-readable storage media of claim 13, wherein the request specifies a range of time, and wherein the data share traces included in the cryptographically verifiable data structure are within the specified range of time.

17. The one or more non-transitory, computer-readable storage media of claim 13, wherein the request specifies a specific service, and wherein the data share traces included in the cryptographically verifiable data structure are for interfaces of the specific service.

18. The one or more non-transitory, computer-readable storage media of claim 13, wherein at least one of the data share traces was dispatched after detecting, by the data share permission compliance management service, that a corresponding one of the different interfaces was new or modified.

19. The one or more non-transitory, computer-readable storage media of claim 14, wherein the different respective data share traces for parameters submitted in the requests via the different interfaces with tags associating the different respective data share traces for parameters submitted in the requests via the different interfaces with respective regions of the different interfaces.

20. The one or more non-transitory, computer-readable storage media of claim 13, wherein the plurality of services are offered by a provider network, and wherein at least one the data share traces includes a location external to the provider network.

* * * * *